United States Patent [19]
Clark et al.

[11] Patent Number: 5,119,984
[45] Date of Patent: Jun. 9, 1992

[54] MANUFACTURE OF METAL TUBES

[75] Inventors: Jack Clark, Eastleigh, England; Patrick B. Ryan, Malawi, South Africa

[73] Assignee: Pirelli General plc, London, England

[21] Appl. No.: 683,782

[22] Filed: Apr. 11, 1991

[51] Int. Cl.$^5$ ............................................. B23K 20/12
[52] U.S. Cl. ...................................... 228/14; 228/148; 228/156; 228/2
[58] Field of Search ............... 228/102, 112, 114, 147, 228/148, 156, 173.7, 2, 9, 17.5

[56] References Cited

U.S. PATENT DOCUMENTS

| 1,650,321 | 11/1927 | Bundy . |       |
|-----------|---------|---------|-------|
| 2,032,271 | 2/1936  | Enghauser | 228/114 |
| 3,831,262 | 8/1974  | Luc .    |       |
| 3,949,896 | 4/1976  | Luc      | 228/112 |
| 4,144,110 | 3/1979  | Luc      | 228/112 |

FOREIGN PATENT DOCUMENTS

| 326980  | 1/1976  | Austria . |
|---------|---------|-----------|
| 954775  | 12/1956 | Fed. Rep. of Germany . |
| 688973  | 3/1953  | United Kingdom . |
| 727684  | 4/1955  | United Kingdom . |
| 1224891 | 3/1971  | United Kingdom . |

Primary Examiner—Samuel M. Heinrich
Attorney, Agent, or Firm—Brooks, Haidt, Haffner & Delahunty

[57] ABSTRACT

An apparatus for forming metal tubes is shown in which a metal strip 2' having a brazing wire 1 bonded to an edge portion thereof passes through the apparatus and is formed by a combination of rollers 17, 17', 19, 19' and dies 15, 24 into a shape defining a tube. A frictional wheel 27 bonds together the two edge portions of the shape defining a tube.

28 Claims, 7 Drawing Sheets

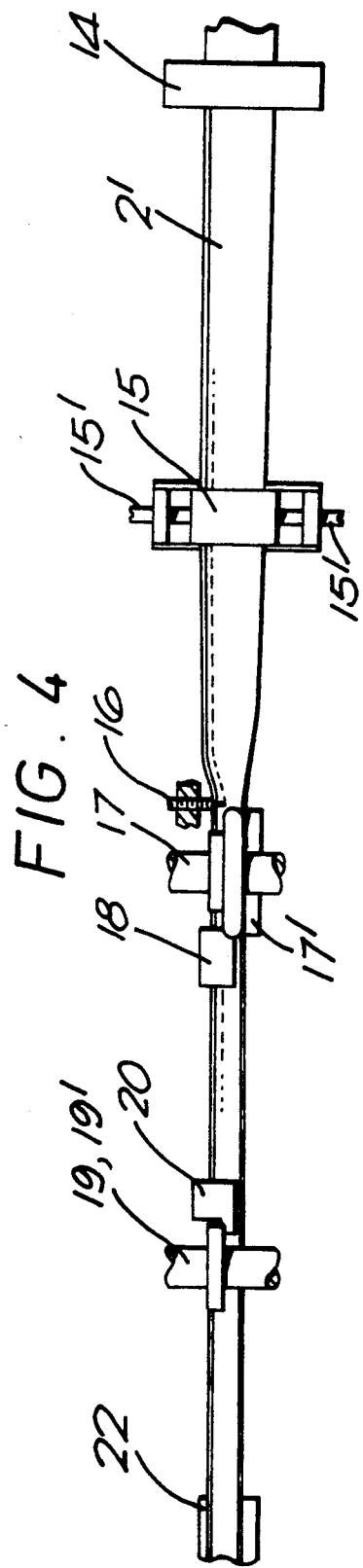
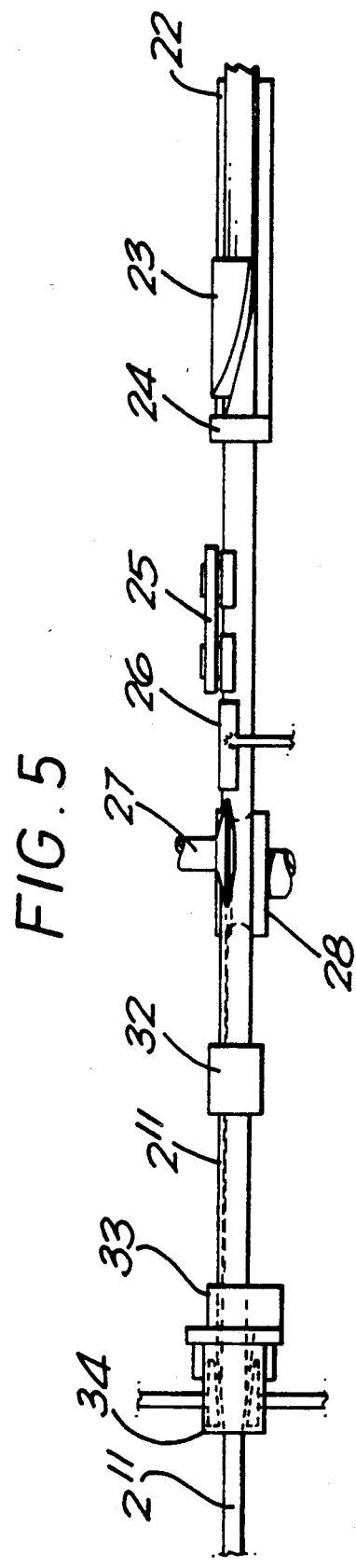
FIG. 4
FIG. 5

MANUFACTURE OF METAL TUBES

The invention relates to an apparatus and method for manufacturing elongate metal tubes and particularly, but not exclusively, to manufacturing tubular copper sheathing for cables.

An apparatus is known for forming bonds between materials which utilises the friction generated by high speed relative movement between a friction tool and the materials to be bonded to form the bond between the materials, and is described in British Patent Specification No. 1224891.

It has been found, however, that for forming bonds between parts made of certain metals such as copper, it is difficult to achieve a satisfactory bond for some applications between the two metal parts using the known process described above. The present applicants have found it necessary to insert a brazing wire between the two metal parts to be bonded. A satisfactory bond is however only achieved if the brazing wire is correctly aligned between the two metal parts with the friction tool. The present invention seeks to achieve accurate alignment of the brazing wire.

The present invention provides an apparatus for manufacturing an elongate metal tube comprising supplying means for supplying a brazing wire onto an edge portion of an elongate metal strip adjacent to and substantially parallel to the free edge thereof, first frictional means for forming a bond between the metal strip and the brazing wire located thereon, means for causing longitudinal relative movement between said first frictional means and the metal strip, forming means for forming the metal strip having brazing wire bonded thereto into a shape which defines a tube such that the brazing wire is sandwiched between said edge portion and the edge portion of the metal strip opposed thereto, second frictional means for forming a bond at the location of the brazing wire between said two edge portions of the metal strip, and means for causing longitudinal relative movement between said second frictional means and the metal strip.

At least one of said frictional means may comprise a wheel adapted to rotate at high speed.

The forming means may comprise a combination of rollers and die means.

The supplying means may include a combination of rollers.

The supplying means may further comprise straightening means for straightening the brazing wire.

The straightening means may comprise a plurality of rollers.

At least one of the rollers may comprise a groove for aligning the brazing wire as it is fed onto the metal strip.

The straightening means may be adapted to at least intermittently apply radial pressure to the brazing wire to at least partially flatten the brazing wire.

The means for causing longitudinal relative movement between the metal strip and said first and/or second frictional means may comprise respective means for moving the metal strip past said frictional means.

The means for moving the metal strip may comprise a plurality of rollers.

The apparatus may be adapted to continuously form an elongate metal strip into a shape defining a tube and move the edge portions longitudinally past said second frictional means.

The apparatus may further comprise detecting means for detecting the absence of or an insufficient tension in the brazing wire and/or metal strip and switching means actuable in response to said detecting means for switching off the longitudinal movement means and/or frictional means in the event of absence of or insufficient tension in the brazing wire and/or metal strip.

The detecting means may comprise a respective roller resting on the brazing wire and/or metal strip and adapted to move downwards in the absence of sufficient tension in the brazing wire and/or metal strip to actuate said switching means.

The apparatus may further comprise means for moving said first and/or second frictional means relative to the metal strip to the last respective location at which bonding occurred before actuation of said switching means.

The apparatus may further comprise means for aligning an elongate object to be housed in the metal tube with the metal strip having the brazing wire bonded thereto prior to the completion of the formation of the metal strip into the shape defining a tube.

The means for aligning an elongate object may comprise guide rail means.

The two said edge portions to be bonded together may have faces opposing each other which are part of the same surface of the metal strip.

The forming means may be such that the two edge portions are placed together in such a way that they protrude from the periphery of the tube and the apparatus may further comprise folding means for folding the protruding edge portions against the periphery of the tube after the edge portions have been bonded together.

The invention also provides a method of manufacturing an elongate metal tube comprising the steps of supplying a brazing wire onto an edge portion of an elongate metal strip adjacent to and substantially parallel to the free edge thereof, forming a bond by means of first frictional means between said metal strip and said brazing wire located thereon, causing longitudinal relative movement between said brazing wire and said first frictional means, forming said metal strip into a shape which defines a tube such that said brazing wire is sandwiched between said edge portion and the edge portion of the metal strip opposed thereto, forming a bond at the location of said brazing wire by means of a second frictional means between said two edge portions of the metal strip, and causing longitudinal relative movement between said edge portions and said second frictional means.

The method may further comprise the step of straightening the brazing wire.

The method may further comprise the step of at least intermittently applying radial pressure to said brazing wire to at least partially flatten said brazing wire.

The method may further comprise the step of aligning an elongate object to be housed in the metal tube with the metal strip prior to the completion of the formation of the metal strip into said shape.

The metal strip may be continuously formed into said shape and said edge portions are longitudinally moved past said second frictional means.

The method may further comprise the step of detecting the absence of or an insufficient tension in said brazing wire and/or metal strip and ceasing the manufacturing process in response to such an absence or insufficient tension being detected.

The metal strip may be formed into said shape such that said two edge portions to be bonded together have faces opposing each other which are part of the same surface of said metal strip.

On completion of the formation of said metal strip into said shape, said edge portions may protrude from the periphery of the tube and are subsequently to bonding folded against said periphery.

In order that the invention may be well understood, a preferred embodiment thereof will now be described in detail below, by way of example only, with reference to the accompanying drawings, in which:

FIG. 4 is a plan view of the portion of the apparatus shown in FIG. 2;

FIG. 5 is a plan view of the portion of the apparatus shown in FIG. 3;

Figure 9:
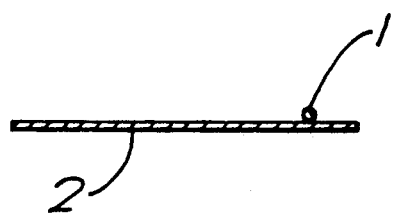
Figure 10:
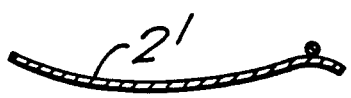
Figure 11:
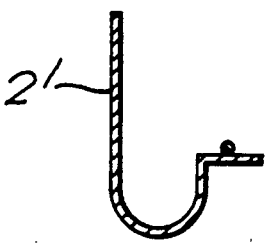
Figure 12:
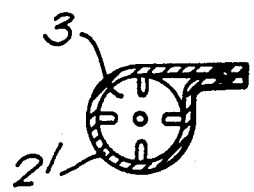
Figure 13:
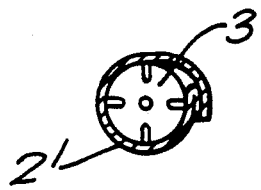

FIGS. 9 to 11 respectively are enlarged cross-sectional views of the metal strip with brazing wire bonded thereon, at various stages of a tube manufacturing process using the apparatus;

FIG. 12 is an enlarged cross-sectional view of a cable prior to the edge portions of the metal strip being bonded together using the apparatus; and FIG. 13 is an enlarged cross-sectional view of a cable subsequently to the protruding edge portions being folded against the periphery of the tube using the apparatus.

Figure 1:
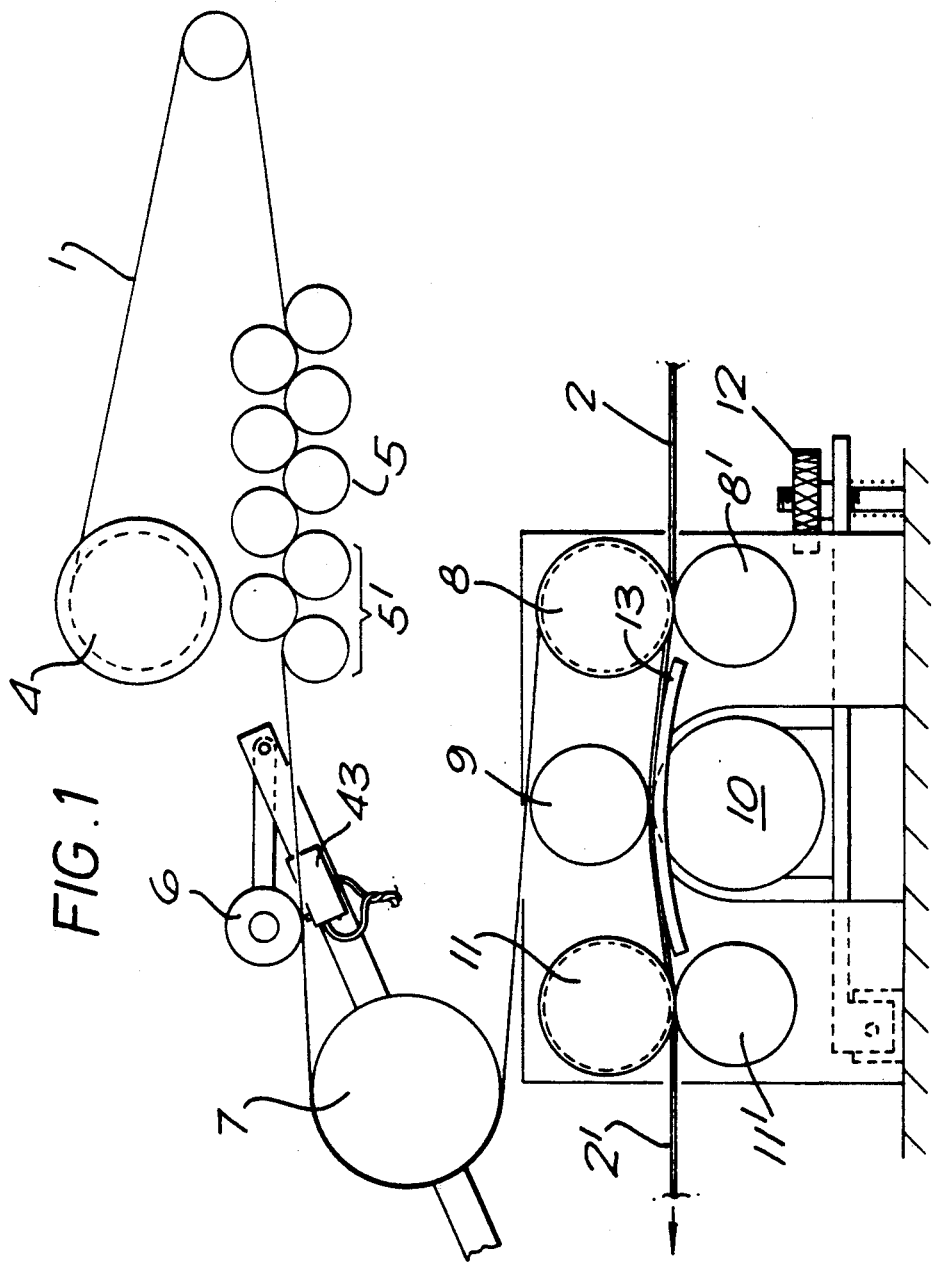
FIG. 1 is a cross-sectional elevational view of a wire brazing station which forms part of a metal tube manufacturing apparatus embodying the present invention.
Figure 2:
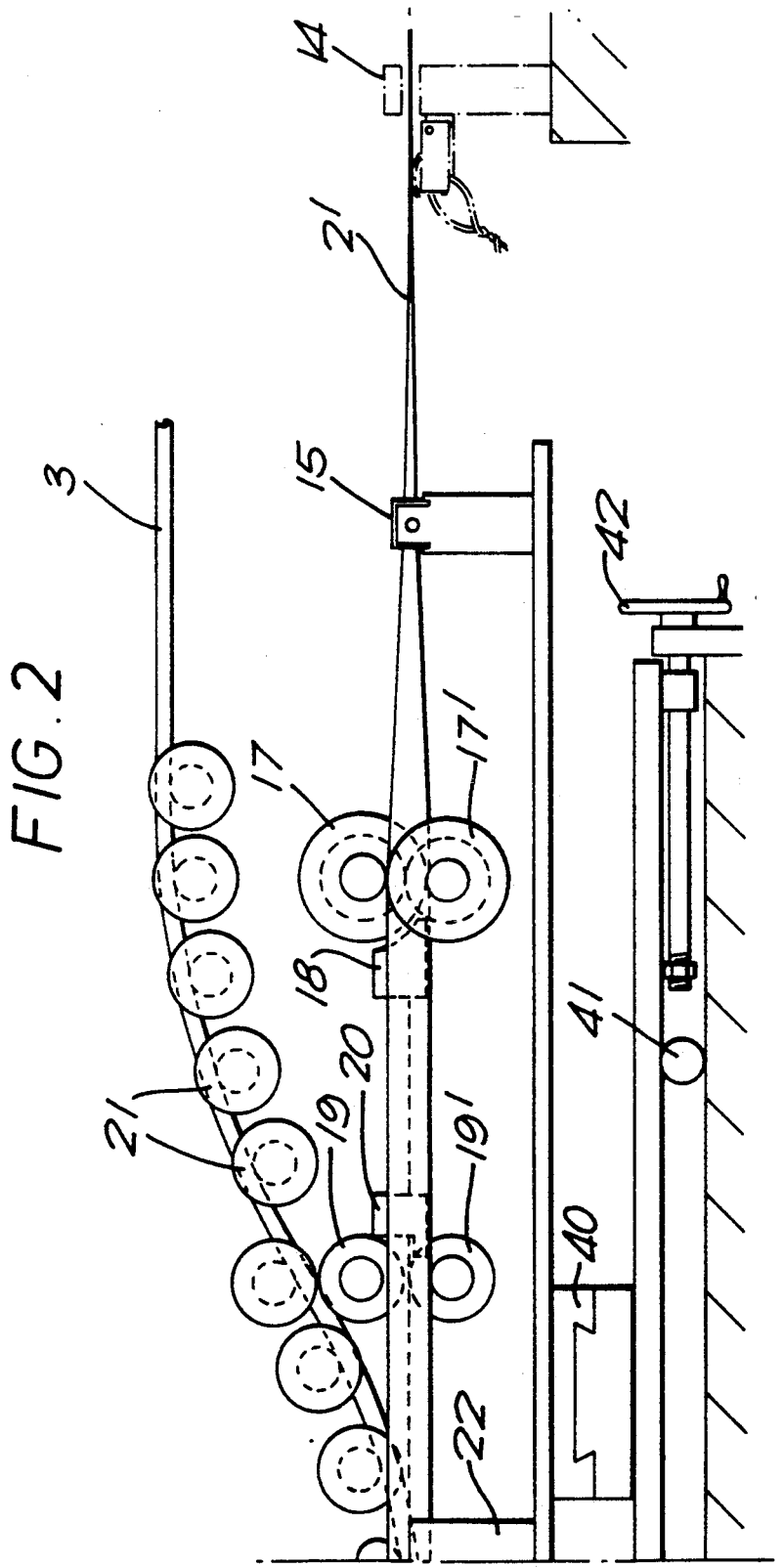
FIG. 2 is a cross-sectional elevational view of a further portion of the metal tube manufacturing apparatus.
Figure 3:
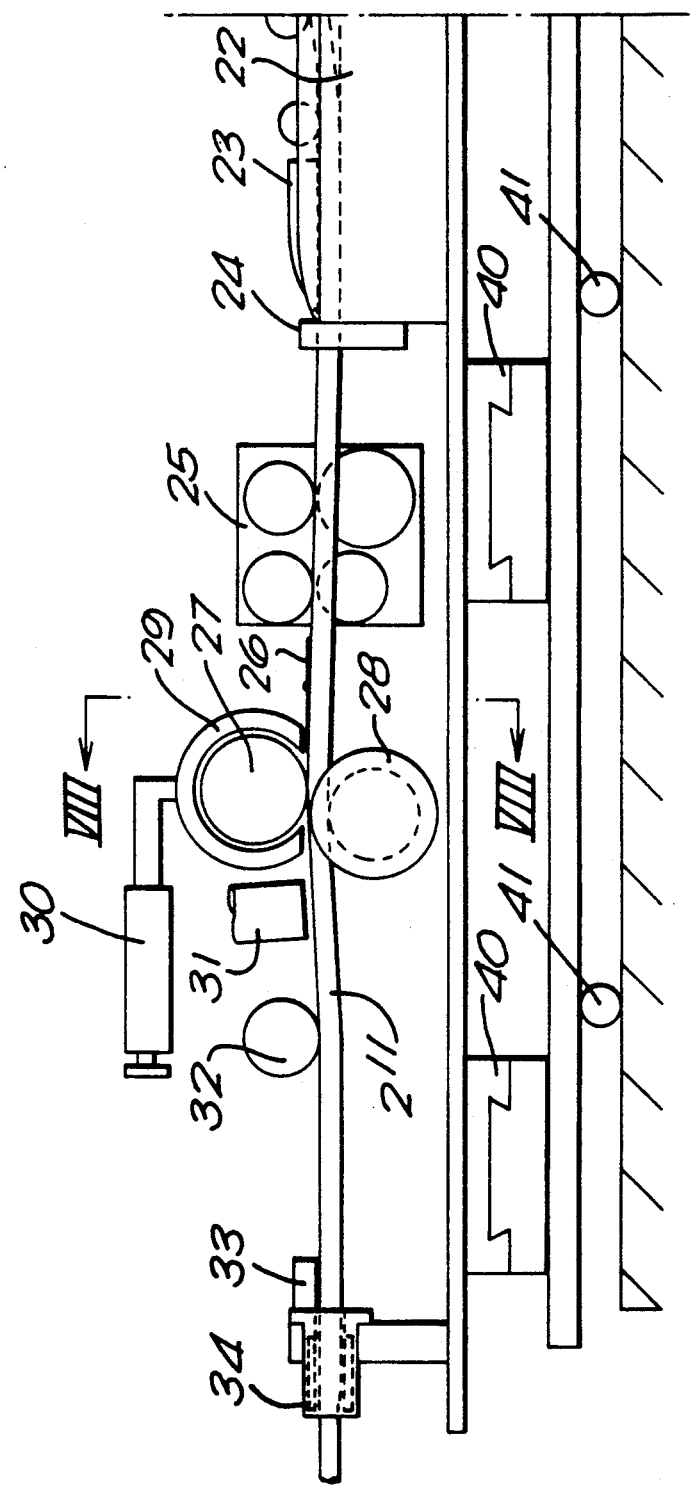
FIG. 3 is a cross-sectional elevational view of the remaining portion of the apparatus.
Figure 6:
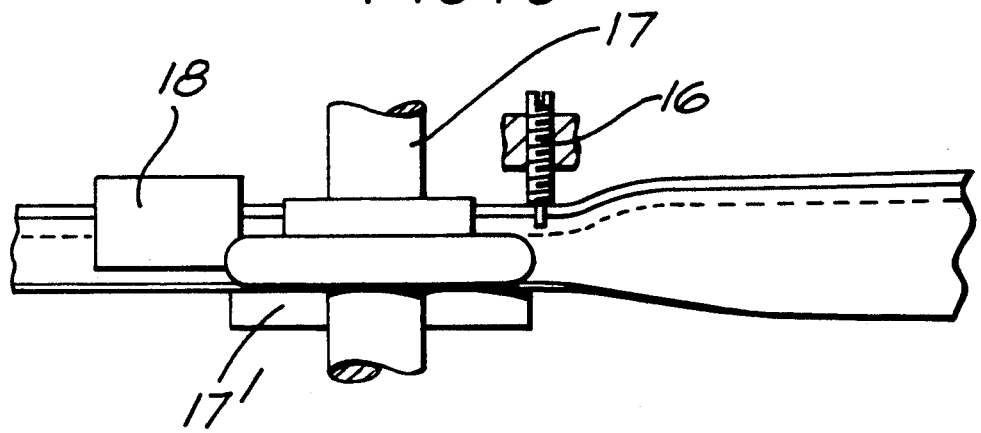
FIG. 6 is an enlarged plan view of a set of tube forming rollers shown in FIGS. 2 and 4.

Referring now to FIGS. 1, 2 and 3, a metal tube manufacturing apparatus is shown which in the present case is used to manufacture copper sheathing for cables. The apparatus comprises supplying means 8, 8' for supplying a brazing wire 1 onto an edge portion of an elongate metal strip 2 adjacent to and substantially parallel to the free edge of the edge portion, a first frictional means 10 for forming a bond between the metal strip 2 and the brazing wire 1, and means 11, 11' for causing longitudinal relative movement between the first frictional means 10 and the metal strip 2. The apparatus also comprises forming means 15, 17, 17', 23, 24 for forming a portion 2' of the metal strip having brazing wire bonded thereon into a shape which defines a tube such that the brazing wire is sandwiched between the two edge portions of the metal strip 2' that are to be bonded together, a second frictional means 27 for forming the bond at the location of the brazing wire between the two edge portions, and means 25 for causing longitudinal relative movement between the second frictional means 27 and the metal strip 2'. The forming means 15, 17, 17', 23, 24 may also assist in causing relative movement between the metal strip 2' and frictional means 10, 27.

The apparatus and its operation will now be described in greater detail with reference to each of the figures separately.

FIG. 1 shows a wire brazing station which forms part of the apparatus, in which a copper strip 2 is supplied through the wire brazing station from right to left as viewed in the figures. A brazing wire 1 is supplied through the wire brazing station at the same time as the copper strip 2, from a spool 4 which has an adjustable friction brake to control the tension in the wire. The brazing wire 1 is preferably a silver/copper/phosphorous alloy in the proportions Ag 15: Cu 80: P5, although any suitable alternative composition may be used. The wire 1 then passes around a guide and into a straightening means which comprises a set of straightening rollers 5 which are mounted with their axes parallel, and then under a weighted roller 6 whose function will be described later. The first and last of the straightening rollers 5 each have a circumferential groove at a position midway along their axes, the grooves serving to align the brazing 1 before it passes over a guide pulley 7 and through the supplying rollers 8, 8'. The straightening rollers 5 are adjusted so that each successive pair 5' of rollers progressively nips the wire 1 which then emerges from the rollers 5 substantially straighter but with small flat portions on its upper and lower surfaces. These help to maintain alignment of the wire 1 as it passes through rollers 8, 8' and to ensure that the wire 1 does not become too deeply embedded in the copper strip 2 as the wire and strip pass through the rollers 8, 8'. The wire 1 emerges from the rollers 8, 8' aligned on the copper strip 2 parallel to and adjacent to one of its longitudinal edges, and the strip 2 is then passed over a slightly arched polished surface 13, which is preferably made of steel, and under a roller 9. The arched surface 13 has a slot therein and a first frictional means 10, which in the present embodiment is a rapidly spinning frictional wheel is placed so that its edge protrudes through the slot sufficiently to touch the copper strip 2. The wire 1 is then bonded by means of the wheel 10 to the copper strip 2 and the strip with the wire bonded thereto 2' then passes through a pair of rollers 11, 11' into the right-hand end of the apparatus as viewed in FIG. 2. The amount of contact between the wheel 10 and the copper strip 2 is varied by raising or lowering the wheel axis by means of the adjusting handwheel 12. The metal strip 2' with the brazing wire 1 bonded thereto now has the cross-section shown in FIG. 9.

Figure 7:
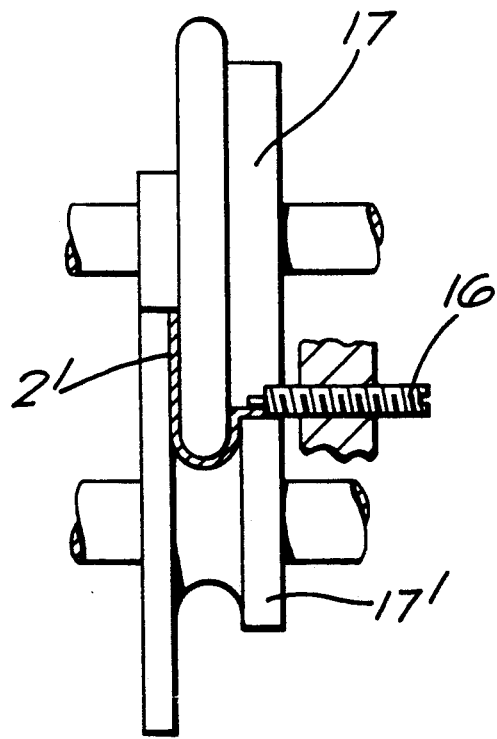
FIG. 7 is an enlarged cross-sectional elevational view of the tube forming rollers shown in FIG. 6.

Referring now to FIGS. 2 and 3, the copper strip with the brazing wire bonded thereto 2' passes through the clamping block 14 (whose function will be described later) and through the forming die 15, which performs part of the function of forming the portion of the metal strip 2' having the wire 1 bonded thereon into a shape which defines a tube. The forming die 15 consists of two matched adjustable parts which preform the strip 2' into a section of about 90° of circular arc having one edge turned slightly downwards, as can be seen in cross-section in FIG. 10. This pre-forming facilitates further forming of the strip 2' by a pair of rollers 17, 17' into a finned U-shape which is shown in cross-section in FIGS. 7 and 11. The adjustable screw 16 shown in FIGS. 4 and 7 locates the edge of the strip 2' before it is formed into a finned U-shape by the rollers 17, 17', as is shown in more detail in cross-section in FIG. 7, the edge portion located by the screw 16 forming the fin of the finned U-shape. A guide block 18 having a profile matching the inner profile of the finned U-shape then aligns the strip 2' as it exits from the rollers 17, 17'. The size and uniformity of the fin are varied by adjustment of the guide block 18 and/or screw 16.

The strip 2' then passes through rollers 19, 19' and a guide block 20 holds the short side of the finned U-shape and the fin securely against the lower roller 19' before the strip 2' passes into a long U-shaped channel guide 22, which in the present embodiment is preferably made of solid nylon. At the same time, a means 21 for aligning an elongate object 3 to be housed in the metal tube (in the present case a cable core) feeds the cable core 3 into the finned U-shaped strip 2'. In the present embodiment the aligning means 21 comprises a plurality of rollers, which serve to limit bending of the cable core 3.

On emerging from the U-channel guide 22, the formation of the strip 2' into a shape defining a tube is completed by the brass block 23 and adjustable guide 24 which fold the high side of the finned U-shape over the top of the cable core 3 such that the high side becomes the upper of the two edge portions of the strip 2' to be bonded together. The now tubular strip 2' containing the core 3 then passes through a set of fin-pinching rollers 25 which exert pressure through the fins so that the brazing wire 1 becomes tightly sandwiched between the fins, and the upper fin-pinching rolls 25 are cam-adjustable so that the pressure which they exert on the fins can be built up gradually.

Figure 8:
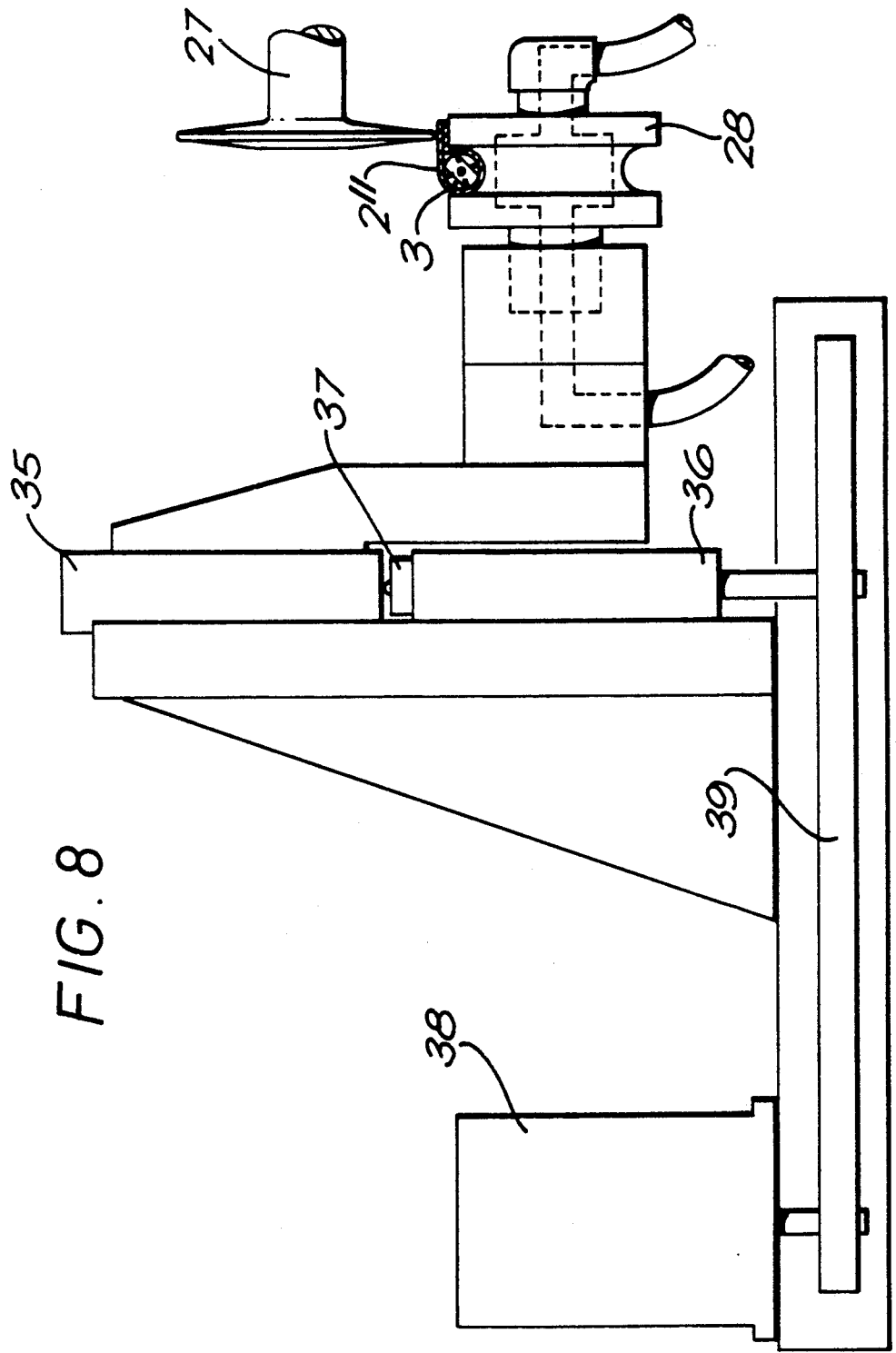
FIG. 8 is an enlarged detailed view taken along the line VIII—VIII in FIG. 3, with some parts omitted.

On leaving the fin-pinching rollers 25, the cable sheath 2' containing the cable core 3, which now has the cross-section shown in FIG. 12, passes the second frictional means 27, which in the present embodiment is also a wheel adapted to rotate at high speed, preferably made of hot work steel. A pressure pad 26 keeps the upper and lower fins of the cable sheath 2' in close contact with each other until the sheath reaches the wheel 27, which is preferably driven at a rotation speed of about 25000 rpm. The sheath 2' is carried beneath the wheel 27 by a brazing anvil 28 which consists of a grooved roller on a cantilevered shaft, as shown more clearly in FIG. 8. The bulk of the cable lies in the groove, the fins being supported on a flat surface adjacent to the groove, and the amount of contact between the wheel 27 and the fins is controlled by vertical movement of the brazing anvil 28 by means of a stepper motor 38, a belt 39, and two slides 35, 36, on the upper one of which 35 the anvil 28 is mounted through a button-type load cell 37. In addition, the strip 2' can be moved parallel to the axis of the wheel 27 since the tube forming apparatus is mounted on slideways 40. In order to reduce the temperature of the sheath 2' during brazing, the anvil 28 is water cooled and the wheel 27 is cooled by means of cold air provided by passing compressed air through a vortex tube 30, the air then being directed via the wheel guard 29 onto the periphery of the wheel 27. The process is also monitored by focussing an infra-red thermometer 31, or any other suitable means, onto the track left by the wheel 27.

The bonded sheath 2' then passes under a flat roller 32, which helps to prevent the sheath 2' from twisting in the brazing anvil 28, and then passes through an anti-twist guide block 33 and a fin-closing die 34. The fin-closing die 34 is in the present embodiment made of steel and is water cooled. It folds the still protruding fins against the periphery of the sheath 2' so that the sheath 2' has the cross-section shown in FIG. 13.

Finally, the functions of the weighted roller 6 shown in FIG. 1 and the clamping block 14 shown in FIGS. 2 and 4 will now be described. The weighted roller 6 in the present embodiment forms a detecting means for detecting the absence of or insufficient tension in the brazing wire 1 and is mounted on an arm about a pivot. If the tension in the brazing wire 1 is sufficient, the weighted roller 6 is maintained in the condition shown in FIG. 1. If the tension in the wire 1 becomes too low or if there is no more brazing wire 1, however, the weighted roller 6 pivots downwards on the arm and operates a switching means 43 for switching off the moving parts of the apparatus. A similar detecting and switching arrangement may be included to detect the absence of or too low a tension in the copper strip 2 and to shut down the moving parts of the apparatus in response to such a detection, though such an additional arrangement is not shown in the figures.

If the apparatus is shut down in such a way in order to renew the brazing wire 1 or copper strip 2, it will be necessary to continue the seam formed by the second frictional means 27, although the speed of the brazing wire 1 and copper strip 2 passing through the apparatus is generally such that in the absence of a brazing wire 1 or copper strip 2, the wire 1 and strip 2' will be able to travel some distance unbonded through the apparatus after it has been shut down. A means 14, 41, 42 for moving the second frictional means 27 responsive to actuation of the switching means comprises a clamping block 14 in which the copper strip 2' is clamped, bearings 41 on which the entire apparatus through which the copper strip 2' passes subsequently to the clamping block 14 is mounted, and a handwheel 42 for moving the apparatus along the copper strip 2' when clamped.

The clamping block 14 may also include a trip-switch which prevents the tube forming apparatus from being switched on when the clamping block 14 is applied to the copper strip 2'. A similar means for moving the first frictional means 10 relative to the metal strip 2 to the last bonding location may also be included, though no such arrangement is shown in the figures.

It will be appreciated that the present invention is not limited in scope to the embodiment or use described in detail above. In particular, an alternative construction of the frictional means may be used, i.e. not using wheels, or the apparatus, instead of receiving a copper strip and brazing wire at one end and continuously delivering manufactured metal tubing with cable core therein at the other end, may be an apparatus which moves along a copper strip which is fixed in position. Furthermore, instead of using detecting means in the form of weighted rollers, optical or any other suitable detectors may be used.

Additionally, whilst the formation of the edge portions to be bonded into a fin arrangement as shown in FIG. 2 is preferred, they may alternatively be simply overlapped in a wrap-around arrangement if the materials of the strip or the contents of the tube during manufacture provide sufficient support.

We claim:

1. An apparatus for manufacturing an elongate metal tube comprising supplying means for supplying a brazing wire onto an edge portion of an elongate metal strip adjacent to and substantially parallel to the free edge thereof, first frictional means for forming a bond between the metal strip and the brazing wire located thereon, means for causing longitudinal relative movement between said first frictional means and the metal strip, forming means for forming the metal strip having brazing wire bonded thereto into a shape which defines a tube such that the brazing wire is sandwiched between said edge portion and the edge portion of the metal strip opposed thereto, second frictional means for forming a bond at the location of the brazing wire between said two edge portions of the metal strip, and means for causing longitudinal relative movement between said second frictional means and the metal strip.

2. An apparatus according to claim 1, wherein at least one of said frictional means comprises a wheel adapted to rotate at high speed.

3. An apparatus according to claim 1 or 2, wherein said forming means comprises a combination of rollers and die means.

4. An apparatus according to claim 1, wherein said supplying means includes a combination of rollers.

5. An apparatus according to claim 4, wherein said supplying means further comprises straightening means for straightening the brazing wire.

6. An apparatus as claimed in claim 5, wherein said straightening means comprises a plurality of rollers.

7. An apparatus as claimed in claim 6, wherein at least one of said rollers comprises a groove for aligning the brazing wire as it is fed onto the metal strip.

8. An apparatus according to claim 6 or 7, wherein said straightening means is adapted to at least intermittently apply radial pressure to the brazing wire to at least partially flatten the brazing wire.

9. An apparatus according to claim 1 wherein said means for causing longitudinal relative movement between the metal strip and said first and/or second frictional means comprises respective means for moving the metal strip past said frictional means.

10. An apparatus according to claim 9, wherein said means for moving the metal strip comprises a plurality of rollers.

11. An apparatus according to claim 9 or 10, wherein the apparatus is adapted to continuously form an elongate metal strip into a shape defining a tube and move the edge portions longitudinally past said second frictional means.

12. An apparatus according to claim 11, further comprising detecting means for detecting the absence of or an insufficient tension in the brazing wire and/or metal strip and switching means actuable in response to said detecting means for switching off the longitudinal movement means and/or frictional means in the event of absence of or insufficient tension in the brazing wire and/or metal strip.

13. An apparatus according to claim 12, wherein said detecting means comprises a respective roller resting on the brazing wire and/or metal strip and adapted to move downwards in the absence of sufficient tension in the brazing wire and/or metal strip to actuate said switching means.

14. An apparatus as claimed in claim 12, further comprising means for moving said first and/or second frictional means relative to the metal strip to the last respective location at which bonding occurred before actuation of said switching means.

15. An apparatus according to claim 1, further comprising means for aligning an elongate object to be housed in the metal tube with the metal strip having the brazing wire bonded thereto prior to the completion of the formation of the metal strip into the shape defining a tube.

16. An apparatus according to claim 15, wherein said means for aligning an elongate object comprises guide rail means.

17. An apparatus according to claim 1, wherein the two said edge portions to be bonded together have faces opposing each other which are part of the same surface of the metal strip.

18. An apparatus according to claim 17, wherein the forming means is such that the two edge portions are placed together in such a way that they protrude from the periphery of the tube and wherein the apparatus further comprises folding means for folding the protruding edge portions against the periphery of the tube after the edge portions have been bonded together.

19. A method of manufacturing an elongate metal tube comprising the steps of supplying a brazing wire onto an edge portion of an elongate metal strip adjacent to and substantially parallel to the free edge thereof, forming a bond by means of first frictional means between said metal strip and said brazing wire located thereon, causing longitudinal relative movement between said brazing wire and said first frictional means, forming said metal strip into a shape which defines a tube such that said brazing wire is sandwiched between said edge portion and the edge portion of the metal strip opposed thereto, forming a bond at the location of said brazing wire by means of a second frictional means between said two edge portions of the metal strip, and causing longitudinal relative movement between said edge portions and said second frictional means.

20. A method according to claim 19, further comprising the step of straightening the brazing wire.

21. A method according to claim 20, further comprising the step of at least intermittently applying radial pressure to said brazing wire to at least partially flatten said brazing wire.

22. A method according to claim 19, further comprising the step of aligning an elongate object to be housed in the metal tube with the metal strip prior to the completion of the formation of the metal strip into said shape.

23. A method according to claim 19, wherein said metal strip is continuously formed into said shape and said edge portions are longitudinally moved past said second frictional means.

24. A method according to claim 23, further comprising the step of detecting the absence of or an insufficient tension in said brazing wire and/or metal strip and ceasing the manufacturing process in response to such an absence or insufficient tension being detected.

25. A method according to claim 19, wherein said metal strip is formed into said shape such that said two edge portions to be bonded together have faces opposing each other which are part of the same surface of said metal strip.

26. A method according to claim 25, wherein on completion of the formation of said metal strip into said shape, said edge portions protrude from the periphery of the tube and are subsequently to bonding folded against said periphery.

27. An apparatus for manufacturing an elongate metal tube comprising forming means for forming a metal strip into a shape defining a tube, means for supplying and locating a brazing wire onto an edge portion of the metal strip adjacent to and substantially parallel to the free edge thereof such that the brazing wire becomes sandwiched between said edge portion and the edge portion of the metal strip opposed thereto, frictional means for forming a bond between said two edge portions at the location of the brazing wire, and means for causing longitudinal relative movement between said frictional means and the metal strip.

28. A method of manufacturing an elongate metal tube comprising forming a metal strip into a shape defining a tube, supplying and locating a brazing wire onto an edge portion of said metal strip adjacent to and substantially parallel to the free edge thereof such that said brazing wire becomes sandwiched between said edge portion and the edge portion of said metal strip opposed thereto, using a frictional means to form a bond between said two edge portions at the location of said brazing wire, and causing longitudinal relative movement between said frictional means and said metal strip.

* * * * *